(12) United States Patent
Xia et al.

(10) Patent No.: US 12,127,196 B2
(45) Date of Patent: Oct. 22, 2024

(54) RESOURCE ALLOCATION METHOD AND DEVICE, STORAGE MEDIUM AND ELECTRONIC DEVICE

(71) Applicant: ZTE Corporation, Shenzhen (CN)

(72) Inventors: Shuqiang Xia, Shenzhen (CN); Chunli Liang, Shenzhen (CN); Jing Shi, Shenzhen (CN); Xianghui Han, Shenzhen (CN); Peng Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 576 days.

(21) Appl. No.: 17/285,143

(22) PCT Filed: Oct. 17, 2019

(86) PCT No.: PCT/CN2019/111727
§ 371 (c)(1),
(2) Date: Apr. 14, 2021

(87) PCT Pub. No.: WO2020/078435
PCT Pub. Date: Apr. 23, 2020

(65) Prior Publication Data
US 2021/0360604 A1    Nov. 18, 2021

(30) Foreign Application Priority Data

Oct. 17, 2018  (CN) .......................... 201811211118.3

(51) Int. Cl.
*H04W 72/20*    (2023.01)
(52) U.S. Cl.
CPC .................................. *H04W 72/20* (2023.01)
(58) Field of Classification Search
CPC ..... H04W 72/20; H04W 92/20; H04W 72/52; H04W 72/51; H04W 72/56; H04L 5/0094
See application file for complete search history.

(56) References Cited

U.S. PATENT DOCUMENTS 6,453,349 B1* 9/2002 Kano .................... H04L 47/724
709/224
7,885,230 B2* 2/2011 Seo ....................... H04L 5/0039
370/332

(Continued)

FOREIGN PATENT DOCUMENTS

CN    101076139 A    11/2007
CN    102036387 A    4/2011

(Continued)

OTHER PUBLICATIONS

International Search Report for corresponding application PCT/CN2019/111727 filed Oct. 17, 2019; Mail date Jan. 25, 2020.

(Continued)

*Primary Examiner* — Ayaz R Sheikh
*Assistant Examiner* — Tarell A Hampton
(74) *Attorney, Agent, or Firm* — CANTOR COLBURN LLP (57) ABSTRACT

Provided are a resource allocation method and device, a storage medium and an electronic device. The method includes the following operations. A first communication node determines resources needing to be allocated to a second communication node, where the resources include K clusters, each cluster includes one or more continuous resources, a maximum value of K is $K_{max}$, $K_{max}$ is a predefined value or a value agreed in advance between the first communication node and the second communication node, and $K_{max}$ is a positive integer greater than 1. The first communication node notifies the second communication node of the resources, wherein the resources are resources needing to be avoided when the second communication node receives and/or sends a channel or a signal, or resources from which the second communication node, when needing (Continued)

to send data, selects one or more clusters of resources to send the data.

18 Claims, 1 Drawing Sheet

(56) References Cited

U.S. PATENT DOCUMENTS

| | | | |
|---|---|---|---|
| 2009/0316814 A1* | 12/2009 | Seo | H04W 48/12 375/260 |
| 2010/0118807 A1* | 5/2010 | Seo | H04L 5/0053 370/329 |
| 2010/0316011 A1* | 12/2010 | Lin | H04L 5/0094 370/329 |
| 2011/0002282 A1* | 1/2011 | Inoue | H04L 5/0037 370/329 |
| 2011/0134861 A1* | 6/2011 | Seo | H04L 5/00 370/329 |
| 2012/0275413 A1* | 11/2012 | Hong | H04L 5/0041 370/329 |
| 2013/0012221 A1 | 1/2013 | Zou et al. | |
| 2013/0051345 A1 | 2/2013 | Ciochina et al. | |
| 2014/0016579 A1 | 1/2014 | Cheng et al. | |
| 2014/0105151 A1* | 4/2014 | Hong | H04L 5/0053 370/329 |
| 2016/0128062 A1 | 5/2016 | Coffey et al. | |

FOREIGN PATENT DOCUMENTS

| | | |
|---|---|---|
| CN | 104579611 A | 4/2015 |
| CN | 105992351 A | 10/2016 |
| CN | 106332286 A | 1/2017 |
| CN | 107734664 A | 2/2018 |
| CN | 108024375 A | 5/2018 |
| EP | 3169106 A1 | 5/2017 |
| EP | 3349520 A1 | 7/2018 |
| WO | 2011160249 A1 | 12/2011 |
| WO | 2015163481 A1 | 10/2015 |
| WO | 2017028699 A1 | 2/2017 |
| WO | 2018171643 A1 | 9/2018 |
| WO | 2018175710 A1 | 9/2018 |

OTHER PUBLICATIONS

European Search Report for corresponding application 19 873 8072; Report date Dec. 10, 2021.

* cited by examiner

RESOURCE ALLOCATION METHOD AND DEVICE, STORAGE MEDIUM AND ELECTRONIC DEVICE

CROSS REFERENCE

This application is a National Stage Filing of the PCT International Application No. PCT/CN2019/111727 filed on Oct. 17, 2019, which claims priority to Chinese Application No. 201811211118.3 filed on Oct. 17, 2018 before the China National Intellectual Property Administration (CNIPA), the entirety of which is herein incorporated by reference.

TECHNICAL FIELD

The present application relates to the field of communications, and in particular, to a resource allocation method and device, a storage medium and an electronic device.

BACKGROUND

In a wireless communication system, multiple types of services are generally supported, and different types of services may have different priorities. In order to guarantee the performance of a service with a high priority, a first communication node or a second communication node may need to send the service with the high priority using all or part of the resources being used by services with low priorities. In order to ensure the performance of these services with different priorities and the utilization efficiency of radio resources, it is necessary for the first communication node to notify the second communication node of the resources occupied by the service with the higher priority.

A common notification manner is to notify the resources using a bitmap manner, for example, resources occupied by the service with the high priority are set to 1, and resources not occupied by the service with the high priority are set to 0. However, this notification manner often requires a large indication overhead, which causes a waste of resources. Still further, in a case where some resources are fixed, this notification manner also causes a decrease in reliability of the indication information, which may further affect performance of the service with the high priority.

There is yet no effective solution for the described problem in the related art.

SUMMARY

Embodiments of the present application provide a resource allocation method and device, a storage medium and an electronic device, which may at least solve the problem of high overhead and low reliability caused by adopting a bitmap notification manner in the related art.

According to an aspect of the embodiments of the present application, a resource allocation method is provided, including: determining, by a first communication node, resources needing to be allocated to a second communication node, wherein the resources include K clusters, each cluster includes one or more continuous resources, a maximum value of K is $K_{max}$, $K_{max}$ is a predefined value or a value agreed in advance between the first communication node and the second communication node, and $K_{max}$ is a positive integer greater than 1; and notifying, by the first communication node, the second communication node of the resources, wherein the resources are resources needing to be avoided when the second communication node receives and/or sends a channel or a signal, or resources from which the second communication node, when needing to send data, selects one or more clusters of resources to send the data.

According to another aspect of the embodiments of the present application, a resource allocation device applied to a first communication node is provided. The resource allocation device includes: a determination module, configured to determine resources needing to be allocated to a second communication node, wherein the resources include K clusters, each cluster including one or more continuous resources, a maximum value of K is $K_{max}$, and $K_{max}$ is a predefined value or a value agreed in advance between the first communication node and the second communication node, and $K_{max}$ is a positive integer greater than 1; and a notification module, configured to notify the second communication node of the resources, wherein the resources are resources needing to be avoided when the second communication node receives and/or sends a channel or a signal, or resources from which the second communication node, when needing to send data, selects one or more clusters of resources to send the data.

According to another embodiment of the present application, a storage medium is provided. The storage medium stores a computer program, wherein the computer program is configured to execute the operations in any one of the method embodiments when running.

According to another embodiment of the present application, an electronic device is provided. The electronic device includes a memory and a processor, wherein the memory stores a computer program, and the processor is configured to run the computer program so as to execute the operations in any one of the method embodiments.

Through the embodiments of the present application, when a second communication node sends a channel or a signal, if the resources occupied by the channel or the signal include the resources needing to be avoided notified by the first communication node, the second communication node needs to stop sending the channel or the signal using the resources needing to be avoided. Alternatively, in a case where the second communication node needs to send data, the second communication node may select one or more clusters of resources from the resources to send data. In this way, the problem of large overhead and low reliability caused by adopting a bitmap notification manner in the related art can be solved, and the overhead of the resources is reduced.

BRIEF DESCRIPTION OF THE DRAWINGS

The accompanying drawings described herein are used to provide a deeper understanding of the present disclosure, and constitute a part of the present application.

The exemplary embodiments of the present disclosure and the description thereof are used to explain the present disclosure. The drawings and the exemplary embodiment do not constitute limitations to the present disclosure. In the drawings.

DETAILED DESCRIPTION OF THE EMBODIMENTS

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

Embodiment 1

Figure 1:
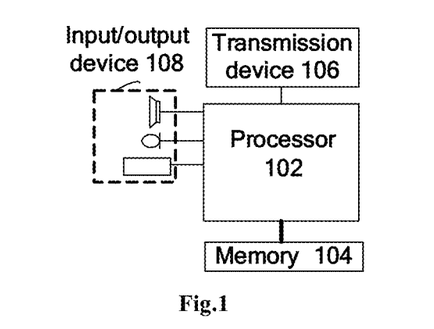
FIG. 1 is a block diagram of the hardware structure of a device implementing a resource allocation method according to an embodiment of the present application.

The method embodiment provided in Embodiment 1 of the present application may be executed in a device. Taking the running on a device as an example, FIG. 1 is a block diagram of the hardware structure of a device implementing a resource allocation method according to an embodiment of the present application. As shown in FIG. 1, the device 10 may include one or more (only one is shown in FIG. 1) processors 102 (the processors 102 may include, but are not limited to, a processing device such as a microprocessor MCU or a programmable logic device FPGA) and a memory 104 configured to store data. In some exemplary implementations, the device may further include a transmission device 106 configured to perform a communication function. The device may further include an input/output device 108. A person having ordinary skill in the art may understand that the structure shown in FIG. 1 is merely exemplary, and does not limit the structure of the foregoing device. For example, the device 10 may include more or fewer components than those shown in FIG. 1, or have a different configuration than that shown in FIG. 1.

The memory 104 may be configured to store a computer program, for example, a software program and a module of application software, such as a computer program corresponding to the resource allocation method in the embodiments of the present application. The processor 102 runs the computer program stored in the memory 104, so as to execute various function applications and data processing, that is, to implement the foregoing method. The memory 104 may include high-speed random access memory, and may also include non-volatile memory, such as one or more magnetic storage devices, flash memory, or other non-volatile solid-state memory. In some examples, the memory 104 may further include memory that is remotely located with respect to processor 102. The remotely located memory may be connected to the device 10 over a network. Embodiments of such networks include, but are not limited to, the Internet, intranets, local area networks, mobile communication networks, and combinations thereof.

The transmission device 106 is configured to receive or send data via a network. Specific examples of the network described above may include a wireless network provided by a communication provider of the device 10. In an example, the transmission device 106 may include a Network Interface Controller (NIC) that may be coupled to other network devices via the first communication node to communicate with the Internet. In one example, the transmission device 106 may be a Radio Frequency (RF) module for communicating wirelessly with the Internet.

Figure 2:
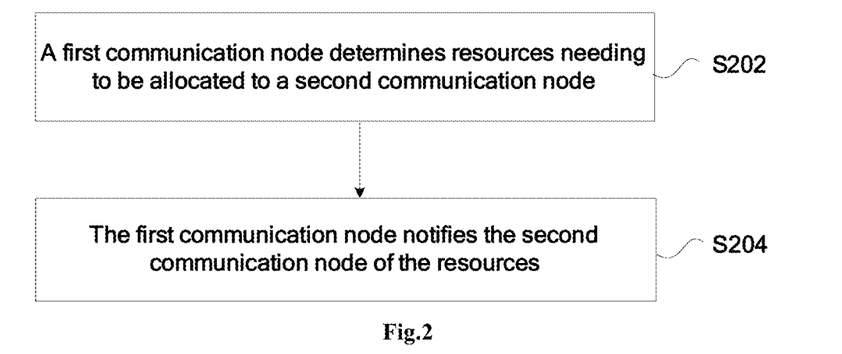
FIG. 2 is a flowchart of a resource allocation method according to an embodiment of the present application.

The present embodiment provides a resource allocation method running on the described device. FIG. 2 is a flowchart of a resource allocation method according to an embodiment of the present application. As shown in FIG. 2, the flow includes operations S202 to S204 which will be described below.

In operation S202, a first communication node determines resources needing to be allocated to a second communication node. In the embodiment, the resources include K clusters, each cluster includes one or more continuous resources, a maximum value of K is $K_{max}$, $K_{max}$ is a predefined value or a value agreed in advance between the first communication node and the second communication node, and $K_{max}$ is a positive integer greater than 1.

In operation S204, the first communication node notifies the second communication node of the resources. In the embodiment, the resources are resources needing to be avoided when the second communication node receives and/or sends a channel or a signal, or resources from which the second communication node, when needing to send data, selects one or more clusters of resources to send the data.

Through the above operations S202 to S204, when the second communication node sends the channel or the signal, if the resources occupied by the channel or the signal include the resources needing to be avoided notified by the first communication node, the second communication node needs to stop sending the channel or the signal using the resources needing to be avoided. Alternatively, in a case where the second communication node needs to send data, the second communication node may select one or more clusters of resources from the resources to send data. In this way, the problem of large overhead and low reliability caused by adopting a bitmap notification manner in the related art can be solved, and the overhead of the resources is reduced.

In some exemplary implementations, the first communication node in the above operation may be a base station in the present embodiment, and the second communication node may be a terminal in the present embodiment. Alternatively, the first communication node may be a terminal, and the second communication node may be a base station. The first communication node and the second communication node may also be other devices which need to indicate resources to each other, and these kinds of devices are also within the scope of protection of the present application.

In this embodiment, the manner in which the first communication node determines the resources needing to be allocated to the second communication node involved in operation S202 may include the following exemplary implementation manners.

Exemplary Implementation 1

In this exemplary implementation, the operation S202 may include operations S11 to S13 which will be described below.

In operation S11, the first communication node allocates, according to the number N of resources, the K clusters of resources to the second communication node from the N resources. In this exemplary implementation, N is a positive integer. In a case where the allocated resources are the K clusters, $S_{2i}$ and $(S_{2i+1}-1)$ are respectively a starting resource index and an ending resource index of the ith cluster, and $S_i(i=0, 1 \ldots 2K-1)$ is a positive integer increasing monotonically.

In operation S12, the first communication node determines a Resource Indication Value (RIV) according to N, K and the starting resource indexes and the ending resource indexes of the clusters.

In operation S13, the first communication node indicates the RIV to the second communication node through at least one first designated bit.

The RIV may be determined in a following manner: when K=1, the RIV is determined according to N, and the starting resource indexes and the ending resource indexes of the clusters; when K>1, the RIV is determined according to N, the starting resource indexes and the ending resource indexes of the clusters, and a sum of allocated numbers of resources when cluster numbers are respectively 1, 2 . . . K−1.

In a specific application scenario, for the foregoing manner of determining the RIV, the RIV may be specifically determined according to a following formula:

$$RIV = \sum_{i=1}^{K-1} C_{N+1}^{2i} + \sum_{i=0}^{2K-1} C_{N+1-S_i}^{2K-i}, \text{ where } \sum_{i=1}^{0} C_{N+1}^{i} = 0;$$

or, $$RIV = \sum_{i=0}^{K-1} \left( C_{N+1}^{2i} + C_{N+1-S_i}^{2K-i} + C_{N+1-S_{K+i}}^{K-i} \right) - 1;$$

wherein K∈{1, 2, . . . , $K_{max}$}.

It should be noted that the number of bits corresponding to the at least one first designated bit involved in the foregoing operation S11 to operation S12 is not less than Q, where Q satisfies a following formula:

$$Q = \left\lceil \log_2 \left( \sum_{i=1}^{2K_{max}} C_N^i \right) \right\rceil.$$

Exemplary Implementation 2

In this exemplary implementation, the operation S202 may include operations S21 to S23 which will be described below.

In operation S21, a first communication node determines that a total number of resources is N, and allocates the K clusters of resources to the second communication node from the N resources. In this exemplary implementation, N is a positive integer. In a case where the allocated resources are the K clusters, $S_{2i}$ and ($S_{2i+1}$−1) are respectively a starting resource index and an ending resource index of an ith cluster, and $S_i$(i=0, 1 . . . 2K−1) is a positive integer increasing monotonically.

In operation S22, in a case where the allocated resources are the K clusters, the first communication node divides resource allocation indication information for indicating resource allocation into first indication information and second indication information. In the exemplary implementation, the first indication information indicates the number K of the allocated clusters, the second indication information indicates starting resource indexes and ending resource indexes of the K clusters, and a value of $K_{max}$ is an integer power of 2.

In operation S23, the first communication node determines a Resource Indication Value (RIV) according to N, the first indication information and the second indication information.

In operation S24, the first communication node indicates the number K of the allocated clusters and the RIV to the second communication node through second designated bits.

In the exemplary implementation, the number of bits corresponding to the second designated bits is not less than Q, wherein $\lceil \log_2(K_{max}) \rceil$ bits of the second designated bits indicate the number K of the allocated clusters, and Q−$\lceil \log_2(K_{max}) \rceil$ bits of the second designated bits indicate the RIV.

Herein, a value of Q satisfies a following formula:

$$Q = \left\lceil \log_2 \left( \sum_{i=1}^{2K_{max}} C_N^i \right) \right\rceil.$$

In a specific application scenario of this embodiment, the RIV may be determined according to a following formula:

$$RIV = \sum_{i=0}^{2K-1} C_{N+1-S_i}^{2K-i},$$

wherein K∈{1, 2, . . . , $K_{max}$}.

Exemplary Implementation 3

In this exemplary implementation, the operation S202 may include operations S31 to S33 which will be described below.

In operation S31, the first communication node allocates, according to the number N of resources, the K clusters of resources to the second communication node from the N resources. In this exemplary implementation, in a case where the allocated resources are the K clusters, $S_{2i}$ and ($S_{2i+1}$−1) are respectively a starting resource index and an ending resource index of the ith cluster, K and N are positive integers, and $S_i$(i=0, 1 . . . 2K−1) is a positive integer increasing monotonically.

In operation S32, the first communication node determines a Resource Indication Value (RIV) for indicating a resource allocation value according to N, K and the starting resource indexes and the ending resource indexes of the clusters.

In operation S33, the first communication node indicates the RIV to the second communication node through at least one third designated bit.

In this exemplary implementation, the RIV may be determined in a following manner. When K=$K_{max}$, the RIV is determined according to N, and the starting resource indexes and the ending resource indexes of the clusters. When 1<=K<$K_{max}$, the RIV is determined according to N, the starting resource indexes and the ending resource indexes of the clusters, and a sum of allocated numbers of resources when cluster numbers are respectively K+1 . . . $K_{max}$.

In a specific application scenario, the RIV may be determined according to a following formula:

$$RIV = \sum_{i=K+1}^{K_{max}} C_{N+1}^{2i} + \sum_{i=0}^{2K-1} C_{N+1-S_i}^{2K-i},$$

wherein $$\sum_{i=K_{max}+1}^{K_{max}} C_{N+1}^{2i} = 0,$$

and K∈{1, 2, ..., $K_{max}$}.

It should be noted that the number of bits corresponding to the at least one third designated bit involved in this embodiment is not less than Q, where Q satisfies a following formula:

$$Q = \left\lceil \log_2\left(\sum_{i=1}^{2K_{max}} C_N^i\right) \right\rceil.$$

Exemplary Implementation 4

In this exemplary implementation, the operation S202 may include operations S41 to S43 which will be described below.

In operation S41, the first communication node allocates, according to the number N of resources, the K clusters of resources to the second communication node from the N resources. In this exemplary implementation, the number of resources of each cluster is greater than a preset threshold X, and K and N are positive integers. In a case where the number of the resources of each cluster is greater than the preset threshold X and the allocated resources are the K clusters, $S_{2i}$ and ($S_{2i+1}$−1) are respectively a starting resource index and an ending resource index of the ith cluster, and $S_i$(i=0, 1 ... 2K−1) is a positive integer increasing monotonically.

In operation S42, the first communication node determines a Resource Indication Value (RIVx) for indicating a resource allocation value according to N, K, X and the starting resource indexes and the ending resource indexes of the clusters;

In operation S43, the first communication node indicates the RIVx through at least one fourth designated bit.

In this exemplary implementation, the RIVx may be determined in a following manner. When K=1, the RIVx is determined according to N, X and the starting resource indexes and the ending resource indexes of the clusters. When K>1, the RIVx is determined according to N, X, the starting resource indexes and the ending resource indexes of the clusters, and a sum of allocated numbers of resources when cluster numbers are respectively 1, 2 ... K−1.

In a specific application scenario, the RIVx may be determined according to a following formula:

$$RIV_X = \sum_{i=1}^{K-1} C_{N+1-iX}^{2i} + \sum_{i=0}^{K-1} \left(C_{N+1-S_{2i}-(K-i)X}^{2K-2i} + C_{N+1-S_{2i+1}-(K-1-i)X}^{2K-(2i+1)}\right),$$

wherein K∈{1, 2, ..., $K_{max}$}.

It should be noted that the number of bits corresponding to the at least one fourth designated bit involved in this embodiment is not less than Q, where Q satisfies a following formula:

$$Q = \left\lceil \log_2\left(\sum_{i=1}^{K_{max}} C_{N+1-iX}^{2i}\right) \right\rceil.$$

Exemplary Implementation 5

In this exemplary implementation, the operation S202 may include operations S51 to S54 which will be described below.

In operation S51, the first communication node determines that a total number of resources is N, and allocates the K clusters of resources to the second communication node from the N resources. In this exemplary implementation, N is a positive integer. In a case where the allocated resources are the K clusters, $S_{2i}$ and ($S_{2i+1}$−1) are respectively a starting resource index and an ending resource index of the ith cluster. Each cluster includes one or more continuous resources, and the number of resources of each cluster is greater than a preset threshold X. $S_i$(i=0, 1 ... 2K−1) is a positive integer increasing monotonically. X is a positive integer.

In operation S52, in a case where the allocated resources are the K clusters, the first communication node divides resource allocation indication information for indicating resource allocation into first indication information and second indication information. In the exemplary implementation, the first indication information indicates the number K of the allocated clusters, the second indication information indicates starting resource indexes and ending resource indexes of the K clusters, and a value of $K_{max}$ is an integer power of 2.

In operation S53, the first communication node determines a Resource Indication Value (RIVx) according to N, the first indication information and the second indication information.

In operation S54, the first communication node indicates the number K of the allocated clusters and the RIVx to the second communication node through fifth designated bits.

In the exemplary implementation, the number of bits corresponding to the fifth designated bits is not less than Q, wherein $\lceil \log_2 K_{max} \rceil$ bits of the fifth designated bits indicate the number K of the allocated clusters, and Q−$\lceil \log_2(K_{max}) \rceil$ bits of the fifth designated bits indicate the RIVx. A value of Q satisfies a following formula:

$$Q = \left\lceil \log_2\left(\sum_{i=1}^{K_{max}} C_{N+1-iX}^{2i}\right) \right\rceil.$$

It should be noted that, in this exemplary implementation, the RIVx may be determined according to a following formula:

$$RIV_X = \sum_{i=0}^{K-1} \left(C_{N+1-S_{2i}-(K-i)X}^{2K-2i} + C_{N+1-S_{2i+1}-(K-1-i)X}^{2K-(2i+1)}\right),$$

Exemplary Implementation 6

In this exemplary implementation, the operation S202 may include operations S61 to S63 which will be described below.

In operation S61, the first communication node allocates, according to the number N of resources, the K clusters of resources to the second communication node from the N resources. In this exemplary implementation, the number of resources of each cluster is greater than a preset threshold X, and K and N are positive integers. In a case where the number of the resources of each cluster is greater than the preset threshold X and the allocated resources are the K clusters, $S_{2i}$ and $(S_{2i+1}-1)$ are respectively a starting resource index and an ending resource index of the ith cluster, and $S_i(i=0, 1 \ldots 2K-1)$ is a positive integer increasing monotonically. X is a positive integer.

In operation S62, the first communication node determines a Resource Indication Value (RIVx) for indicating a resource allocation value according to N, K, X and the starting resource indexes and the ending resource indexes of the clusters.

In operation S63, the first communication node indicates the RIVx to the second communication node through at least one sixth designated bit.

In this exemplary implementation, the RIVx may be determined in a following manner. When $K=K_{max}$, the RIVx is determined according to N, X and the starting resource indexes and the ending resource indexes of the clusters. When $1<=K<K_{max}$, the RIVx is determined according to N, X, the starting resource indexes and the ending resource indexes of the clusters, and a sum of allocated numbers of resources when cluster numbers are respectively $K+1 \ldots K_{max}$.

It should be noted that, in a specific application scenario, the RIVx may be determined according to a following formula:

$$RIV_x = \sum_{i=K+1}^{K_{max}} C_{N+1-iX}^{2i} + \sum_{i=0}^{K-1} \left( C_{N+1-S_{2i}-(K-i)X}^{2K-2i} + C_{N+1-S_{2i+1}-(K-1-i)X}^{2K-(2i+1)} \right),$$

wherein $K \in \{1, 2, \ldots, K_{max}\}$.

The number of bits corresponding to the at least one sixth designated bit is not less than Q, where Q satisfies a following formula:

$$Q = \left\lceil \log_2 \left( \sum_{i=1}^{K_{max}} C_{N+1-iX}^{2i} \right) \right\rceil.$$

With regard to the described exemplary implementations 1 to 6, the following condition needs to be satisfied: $4K_{max+1} \leq N$.

The solution provided in Embodiment 1 is described below in detail with reference to the following Embodiments 2 and 3.

Embodiment 2

In this embodiment, assuming that a total number of resources is N, the indexes of the resources are respectively 1, 2 ... N, and a minimum granularity for resource allocation is 1 resource. A base station notifies a terminal of resources needing to be avoided when the terminal receives and/or sends a signal among the N resources. Specifically, when a terminal sends a channel or a signal, if the resources occupied by the channel or the signal contain a part of the foregoing resources needing to be avoided, the terminal needs to stop using the avoided resources to send the channel or the signal, or even stop sending the entire channel or signal. Alternatively, when a terminal detects a received channel or signal, if the resources occupied by the channel or the signal contain a part of the foregoing resources needing to be avoided, the part of channel or signal on the corresponding resources needing to be avoided needs to be deducted, or even the detection of the entire channel or signal is stopped.

It should be noted that, in this embodiment, the resources notified by the base station to the terminal include K clusters. A maximum value of K is $K_{max}$, and $K_{max}$ is an integer greater than 1. Each cluster corresponds to one or more continuous resources. A starting resource index and an ending resource index of the kth (k=0, 1 ... K-1) cluster are respectively $S_{2k}$ and $S_{2k-1}-1$, where $S_i(i=0, 1, \ldots, 2K-1)$ increases monotonically, and $S_i \in \{1, 2, \ldots, N+1\}$.

Figure 3:
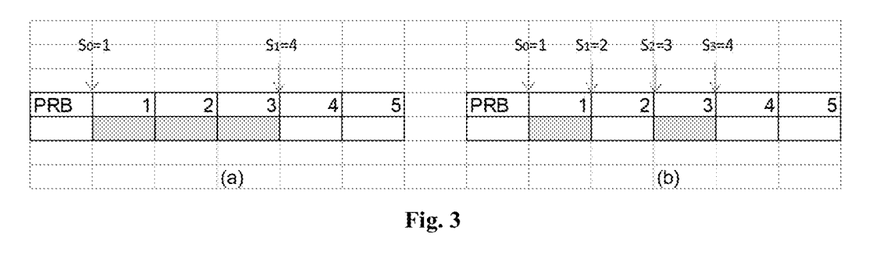
FIG. 3 is a diagram of a mapping relation between a resource index S, and resources corresponding to a cluster according to an embodiment of the present application.

It should be noted that, when $S_{2k+1}-S_{2k}=1$, it represents that the kth cluster corresponds to one resource with a resource index $S_{2k}$. FIG. 3 is a diagram of a mapping relation between a resource index S, and resources corresponding to a cluster according to an embodiment of the present application. FIG. 3 shows examples in which a Physical Resource Block (PRB) is taken as a unit of the resource, and N=5 and $K_{max}$=2. As shown in part (a) of FIG. 3, when the resources are allocated into one cluster (which means that K=1), in a case where $S_0$=1, $S_1$=4, the represented resource allocation corresponds to the resources with the starting resource index and the ending resource index respectively being $S_0$, $S_1$-1, in other words, the resources of the cluster with the starting resource index being 1 (corresponding to $S_0$), and the ending resource index being 3 (corresponding to $S_1$-1), that is, the allocated resource indexes are {1, 2, 3}.

As shown in (b) in FIG. 3, when K=2, the first cluster corresponds to $S_0$=1, $S_1$=1, and the second cluster corresponds to $S_2$=3, $S_4$=4, so the represented resource allocation corresponds to the cluster with the resource index being 1 and the cluster with the resource index being 3.

It should be noted that, in a case where $K_{max}$ and N are known to the transmitter and the receiver in advance, the resource indication method of the embodiment of the present application is as follows.

Manner 1 (Corresponding to the Exemplary Implementation 1 in the Foregoing Embodiment 1)

A Resource Indication Value (RIV) is used to indicate a corresponding relation with the number K of the allocated clusters and the starting resource index and the ending resource index of each cluster. The RIV may be obtained according to the following formula 1-1 or formula 1-2:

$$RIV = \sum_{i=0}^{K-1} C_{N+1}^{2i} + \sum_{i=0}^{2K-1} C_{N+1-S_i}^{2K-i} \quad \text{(Formula 1-1)}$$

$$RIV = \sum_{i=0}^{K-1} (C_{N+1}^{2i} + C_{N+1-S_i}^{2K-i} + C_{N+1-S_{K+i}}^{K-i}) - 1 \quad \text{(Formula 1-2)}$$

For $C_a^b$ when a<b, $C_a^b$ is specified to be 0 (hereinafter the same specification applies). In addition, $$\sum_{i=1}^{0} C_N^i = 0.$$

In this embodiment, Q bits are used to indicate resource allocation information, and the resource allocation information carries the RIV. Q may be obtained according to the following formula 1-3 or 1-4:

$$Q = \left\lceil \log_2 \left( \sum_{i=1}^{2K_{max}} C_N^i \right) \right\rceil \quad \text{(Formula 1-3)}$$

-continued $$Q = \left\lceil \log_2\left(\sum_{i=1}^{K_{max}} C_{N+1}^{2i}\right) \right\rceil \quad \text{(Formula 1-4)}$$

It should be noted that, formulas 1-3 and 1-4 are equivalent.

This embodiment is described below with reference to some examples in specific application scenarios.

When N=10, $K_{max}$=2, the embodiments of RIV calculation are provided. Table 1 illustrates RIV values corresponding to the starting resource indexes and the ending resource indexes of different clusters when the number K of allocated clusters is 1. Table 2 illustrates RIV values corresponding to the starting resource indexes and the ending resource indexes of different clusters when the number K of allocated clusters is 2.

For example, when K=1, $S_0$=1, $S_1$=2, the value of RIV obtained according to formula (1-1) is as follows:

$$RIV = \sum_{i=1}^{K-1} C_{N+1}^{2i} + \sum_{i=0}^{2K-1} C_{N+1-S_i}^{2K-i}$$

$$= \sum_{i=1}^{0} C_{10+1}^{2i} + C_{11-1}^{2} + C_{11-2}^{1}$$

$$= 0 + 45 + 9$$

$$= 54$$

For another example, when K=2, $S_0$=1, $S_1$=2, $S_2$=3, $S_3$=5, the value of RIV obtained according to formula (1-1) is as follows:

$$RIV = \sum_{i=1}^{K-1} C_{N+1}^{2i} + \sum_{i=0}^{2K-1} C_{N+1-S_i}^{2K-i}$$

$$= C_{11}^{2} + C_{11-1}^{4} + C_{11-2}^{3} + C_{11-3}^{2} + C_{11-5}^{1}$$

$$= 55 + 210 + 84 + 28 + 6$$

$$= 383$$

Tables 1 and 2 are as follows:

TABLE 1

| K | N | $S_0$ | $S_1$ | RIV |
|---|---|---|---|---|
| 1 | 10 | 1 | 2 | 54 |
| 1 | 10 | 1 | 3 | 53 |
| 1 | 10 | 1 | 4 | 52 |
| 1 | 10 | 1 | 5 | 51 |
| 1 | 10 | 1 | 6 | 50 |
| 1 | 10 | 2 | 3 | 44 |
| 1 | 10 | 2 | 4 | 43 |
| 1 | 10 | 2 | 5 | 42 |
| 1 | 10 | 2 | 6 | 41 |
| ... | ... | ... | ... | ... |
| 1 | 10 | 8 | 10 | 4 |
| 1 | 10 | 8 | 11 | 3 |
| 1 | 10 | 9 | 10 | 2 |
| 1 | 10 | 9 | 11 | 1 |
| 1 | 10 | 10 | 11 | 0 |

TABLE 2

| K | N | $S_0$ | $S_1$ | $S_2$ | $S_3$ | RIV |
|---|---|---|---|---|---|---|
| 2 | 10 | 1 | 2 | 3 | 4 | 384 |
| 2 | 10 | 1 | 2 | 3 | 5 | 383 |
| 2 | 10 | 1 | 2 | 3 | 6 | 382 |
| 2 | 10 | 1 | 2 | 3 | 7 | 381 |
| 2 | 10 | 1 | 2 | 3 | 8 | 380 |
| ... | ... | ... | ... | ... | ... | ... |
| 2 | 10 | 1 | 2 | 3 | 11 | 377 |
| 2 | 10 | 1 | 2 | 4 | 5 | 376 |
| ... | ... | ... | ... | ... | ... | ... |
| 2 | 10 | 1 | 2 | 4 | 11 | 370 |
| 2 | 10 | 1 | 2 | 5 | 6 | 369 |
| 2 | 10 | 2 | 3 | 4 | 6 | 263 |
| ... | ... | ... | ... | ... | ... | ... |
| 2 | 10 | 7 | 9 | 10 | 11 | 56 |
| 2 | 10 | 8 | 9 | 10 | 11 | 55 |

In this embodiment, each RIV is indicated by Q bits, where:

$$Q = \left\lceil \log_2\left(\sum_{i=1}^{2K_{max}} C_N^i\right) \right\rceil = \lceil \log_2(C_{10}^1 + C_{10}^2 + C_{10}^3 + C_{10}^4) \rceil = \lceil \log_2(385) \rceil = 9;$$

or, $$Q = \left\lceil \log_2\left(\sum_{i=1}^{K_{max}} C_{N+1}^{2i}\right) \right\rceil = \lceil \log_2(C_{11}^2 + C_{11}^4) \rceil = \lceil \log_2(385) \rceil = 9$$

The above description is made from the perspective of the base station. For the Manner 1, the implementation from the perspective of the terminal is achieved in the following mode.

The mode for the terminal to determine the resource allocation information according to the RIV is as follows.

The terminal firstly determines the number K of the allocated clusters, K=U, and RIV belongs to an range $$\left[\sum_{i=1}^{2(U-1)} C_N^i, \sum_{i=1}^{2U} C_N^i\right),$$

U∈{1, 2, ..., $K_{max}$} It should be noted that $C_N^0$=0.

$$\sum_{i=1}^{0} C_N^i = 0.$$

In addition, the starting resource index and the ending resource index of each cluster may be determined in a following manner:

$$RIV = RIV - \sum_{i=1}^{2(K-1)} C_N^i.$$

Therefore, when the RIV belongs to the range [$C_{N+1-x(0)}^{2K}$, $C_{N+2-x(0)}^{2K}$), x(0)∈{1, 2, 3, ..., N}, $S_0$=x(0). When there are a plurality of x(0) satisfying this condition, $S_0$ takes the smallest one of the plurality of x(0).

RIV=RIV−$C_{N+1-S_1}^{2K-1}$,

When the RIV belongs to the range [$C_{N+1-x(1)}^{2K-1}$, $C_{N+2-x(1)}^{2K-1}$), x(1)∈{$S_0$+1, $S_0$+2, ..., N}, $S_1$=x(1). When there are a plurality of x(1) satisfying this condition, S, takes the smallest one of the plurality of x(1).

$$RIV = RIV - C_{N+1-S_1}^{2K-1},$$

Therefore, when the RIV belongs to the range $[C_{N+1-x(2)}^{2K-2}, C_{N+2-x(2)}^{2K-2})$, $x(2) \in \{S_1+1, S_1+2, \ldots, N\}$, $S_2 = x(2)$. When there are a plurality of x(2) satisfying the condition, $S_2$ takes the smallest one of the plurality of x(2).

It should be noted that, other situations in this embodiment may be deduced by analogy, which are not described in this embodiment.

The processing on a terminal is illustrated below with reference to some exemplary implementation.

For example, when N=10, $K_{max}$=2, and RIV=54, the value of K is determined in a following manner.

Since $K_{max}$=2, the received RIV value is divided into two ranges:

when U=1, the corresponding range is $$\left[\sum_{i=1}^{2(U-1)} C_N^i, \sum_{i=1}^{2U} C_N^i\right) = [0, C_{10}^1 + C_{10}^1) = [0, 55);$$

and when U=2, the corresponding range is $$\left[\sum_{i=1}^{2(U-1)} C_N^i, \sum_{i=1}^{2U} C_N^i\right) = [55, C_{10}^1 + C_{10}^2 + C_{10}^3 + C_{10}^4) = [55, 385).$$

Since RIV=50, which belongs to the range corresponding to U=1, K=1, that is, one cluster is allocated.

The starting resource index and the ending resource index corresponding to the cluster are determined, and therefore the value of the RIV is updated to $$RIV = RIV - \sum_{i=1}^{2(K-1)} C_N^i = 54 - 0 = 54.$$

When x(0)=1, the corresponding range is $[C_{N+1-x(0)}^{2K}, C_{N+2-x(0)}^{2K})=[45, 55)$. Since RIV=54, which belongs to this range, $S_0 = x(0) = 1$.

The value of the RIV is updated as RIV=RIV−$C_{N+1-S_0}$=54−45=9.

When x(1)=2, the corresponding range is $[C_{N+1-x(1)}^{2K-1}, C_{N+2-x(1)}^{2K-1})=[9, 10)$. Since the RIV belongs to this range, $S_1 = x(1) = 2$.

Based on this, when the received RIV=54, it can be determined that one cluster of resource is correspondingly allocated, and the allocated resource is a resource with a resource index being 1. In this example, $S_1 - S_0 = 1$, therefore the corresponding resource is a PRB with a resource index being 1.

In addition, as shown in Table 1, RIV=54 corresponds to $S_0=1, S_1=2$, that is, the corresponding resource allocation is resource allocation with a resource index being 1.

For another example, when the received RIV=383, the following operations are performed.

(1) Determining the Value of K

Since $K_{max}$=2, the received RIV is divided into two ranges:

when U=1, the corresponding range is $$\left[\sum_{i=1}^{2(U-1)} C_N^i, \sum_{i=1}^{2U} C_N^i\right) = [0, C_{10}^1 + c_{10}^1) = [0, 55);$$

and when U=2, the corresponding range is $$\left[\sum_{i=1}^{2(U-1)} C_N^i, \sum_{i=1}^{2U} C_N^i\right) = [55, C_{10}^1 + C_{10}^2 + C_{10}^3 + C_{10}^4) = [55, 385).$$

Since RIV=383, which belongs to the range of U=2, K=2, that is, two clusters are allocated. The starting resource indexes and the ending resource indexes corresponding to the clusters are determined.

The value of the RIV is updated as $$RIV = RIV - \sum_{i=1}^{2(K-1)} C_N^i = 383 - 55 = 328.$$

When x(0)=1, the corresponding range is $[C_{N+1-x(0)}^{2K}, C_{N+2-x(0)}^{2K})=[C_{10}^4, C_{11}^4)=[210, 330)$.

Since RIV=328, which belongs to this range, $S_0 = x(0) = 1$.

The value of the RIV is updated as RIV=RIV−$C_{N+1-S_0}^4$=328−$C_{10}^4$=328−210=118.

When x(1)=2, the corresponding range is $[C_{N+1-x(1)}^{2K-1}, C_{N+2-x(1)}^{2K-1})=[C_9^3, C_{10}^3)=[84,128)$. Since RIV=118, which belongs to this range, $S_1 = x(1) = 2$.

The value of the RIV is updated as RIV=RIV−$C_{N+1-S_2}^{2K-2}$=118−$C_9^3$=118−84=34.

When x(2)=3, the corresponding range is $[C_{N+1-x(2)}^{2K-2}, C_{N+2-x(2)}^{2K-2})=[C_8^2, C_9^2)=[28, 36)$. Since RIV=34, which belongs to this range, $S_2 = x(2) = 3$.

The value of the RIV is updated as RIV=RIV−$C_{N+1-S_2}^{2K-2}$=34−$C_8^2$=34−28=6.

When x(3)=5, the corresponding range is $[C_{N+1-x(2)}^{2K-3}, C_{N+2-x(2)}^{2K-3})=[C_6^1, C_7^1)=[6, 7)$. Since RIV=6, which belongs to this range, $S_3 = x(3) = 5$.

Therefore, when RIV=383, two clusters of resources are correspondingly allocated. The starting resource index and the ending resource index of the resource allocation corresponding to the first cluster are $S_0, S_1-1$, that is, the resource allocation of the first cluster is a resource with a resource index of 1. The starting resource index and the ending resource index of the resource allocation corresponding to the second cluster are $S_2, S_3-1$, that is, the resource allocation of the second cluster is resources with resource indexes of {3, 4}.

As shown in Table 2, RIV=383 corresponds to $S_0=1, S_1=2, S_2=3, S_3=5$, that is, one cluster with a resource index of 1 and another cluster with resource indexes of {3, 4} are allocated.

Manner 2 (Corresponding to the Exemplary Implementation 2 in the Foregoing Embodiment 1)

The resource allocation information is divided into two parts, wherein part 1 is the number K of the allocated clusters, and part 2 is the starting resource indexes and the ending resource indexes of the K clusters. Considering that $K_{max}$ clusters are supported at most, $K \in \{1, 2, \ldots, K_{max}\}$. A preferred $K_{max}$ is an integer power of 2, for example, $K=1, 2, 4, 8 \ldots$ In this case, $\lceil \log_2(K_{max}) \rceil$ bits are adopted to indicate the value of K, and $(Q-\lceil \log_2(K_{max}) \rceil)$ bits are adopted to indicate the value RIV corresponding to the starting resource indexes and the ending resource indexes of the K clusters. The RIV is determined according to the following formula 1-5:

$$RIV = \sum_{i=0}^{2K-1} C_{N+1-S_i}^{2K-i} \quad \text{(Formula 1-5)}$$

At the receiving device, the terminal determines the resource allocation information according to the RIV in a following manner:
1. Determining the number K of the clusters based on the bit value indicated in part 1 bit;
2. Determining the starting resource index and the ending resource index of each cluster in, for example, the following manner.

When RIV belongs to a range $[C_{N+1-x(0)}^{2K}, C_{N+2-x(0)}^{2K})$, $x(0) \in \{1, 2, 3, \ldots, N\}$, $S_0 = x(0)$. When there are a plurality of x(0) satisfying the condition, $S_0$ takes the smallest one of the plurality of x(0).

$$RIV = RIV - C_{N+1-S_0}^{2K},$$

When RIV belongs to a range $[C_{N+1-x(1)}^{2K-1}, C_{N+2-x(1)}^{2K-1})$, $x(1) \in \{S_0+1, S_0+2, \ldots, N\}$, $S_1 = x(1)$.

When there are a plurality of x(1) satisfying the condition, $S_1$ takes the smallest one of the plurality of x(1).

$$RIV = RIV - C_{N+1-S_1}^{2K-1},$$

When RIV belongs to a range $[C_{N+1-x(2)}^{2K-2}, C_{N+2-x(2)}^{2K-2})$, $x(2) \in \{S_1+1, S_1+2, \ldots, N\}$, $S_2 = x(2)$. When there are a plurality of x(2) satisfying the condition, $S_2$ takes the smallest one of the plurality of x(2).

Manner 3 (Corresponding to the Exemplary Implementation 3 in the Foregoing Embodiment 1)

A Resource Indication Value (RIV) corresponds to the number K of allocated clusters, and the starting resource index and the ending resource index of each cluster. Specifically, the RIV may be determined according to formula 1-6:

$$RIV = \sum_{j=K+1}^{K_{max}} C_{N+1}^{2j} + \sum_{i=0}^{2K-1} C_{N+1-S_i}^{2K-i} \quad \text{(Formula 1-6)}$$

wherein when $$K = K_{max}, \sum_{j=K+1}^{K_{max}} C_{N+1}^{2j} = 0.$$

In this embodiment, Q bits are used to indicate resource allocation information (the RIV), where Q may be determined according to a following formula:

$$Q = \left\lceil \log_2 \left( \sum_{i=1}^{2K_{max}} C_N^i \right) \right\rceil$$

In an exemplary implementation of this embodiment, taking N=10, $K_{max}$=2 as an example, a calculation embodiment of an RIV is provided below. Table 3 illustrates the RIV values corresponding to the starting resource indexes and the ending resource indexes of different clusters when the number of allocated clusters K=2. Table 4 illustrates the RIV values corresponding to the starting resource indexes and the ending resource indexes of different clusters when the number of allocated clusters K=1.

For example, when K=2, $S_0=1$, $S_1=2$, $S_2=3$, $S_3=5$, the RIV is calculated as follows according to formula (1-5):

$$RIV = \sum_{i=K+1}^{K_{max}} C_{N+1}^{2i} + \sum_{i=0}^{2K-1} C_{N+1-S_i}^{2K-i}$$

$$= 0 + C_{11-1}^4 + C_{11-2}^3 + C_{11-3}^2 + C_{11-5}^1$$

$$= 210 + 84 + 28 + 6$$

$$= 328$$

For another example, when K=1, $S_0=1$, $S_1=2$, the RIV is calculated as follows according to formula (1-5):

$$RIV = \sum_{i=k-1}^{K_{max}} C_{N+1}^{2i} + \sum_{i=0}^{2K-1} C_{N+1-S_i}^{2K-i}$$

$$= C_{11}^4 + C_{11-1}^2 + C_{11-2}^1$$

$$= 330 + 45 + 9$$

$$= 384$$

Tables 3 and 4 are as follows:

TABLE 3

| K | N | $S_0$ | $S_1$ | $S_2$ | $S_3$ | RIV |
|---|---|---|---|---|---|---|
| 2 | 10 | 1 | 2 | 3 | 4 | 329 |
| 2 | 10 | 1 | 2 | 3 | 5 | 328 |
| 2 | 10 | 1 | 2 | 3 | 6 | 327 |
| 2 | 10 | 1 | 2 | 3 | 7 | 326 |
| 2 | 10 | 1 | 2 | 3 | 8 | 325 |
| ... | ... | ... | ... | ... | ... | ... |
| 2 | 10 | 1 | 2 | 3 | 11 | 322 |
| 2 | 10 | 1 | 2 | 4 | 5 | 321 |
| ... | ... | ... | ... | ... | ... | ... |
| 2 | 10 | 1 | 2 | 4 | 11 | 315 |
| 2 | 10 | 1 | 2 | 5 | 6 | 314 |
| 2 | 10 | 2 | 3 | 4 | 6 | 208 |
| ... | ... | ... | ... | ... | ... | ... |
| 2 | 10 | 7 | 9 | 10 | 11 | 1 |
| 2 | 10 | 8 | 9 | 10 | 11 | 0 |

TABLE 4

| K | N | $S_0$ | $S_1$ | RIV |
|---|---|---|---|---|
| 1 | 10 | 1 | 2 | 384 |
| 1 | 10 | 1 | 3 | 383 |
| 1 | 10 | 1 | 4 | 382 |

TABLE 4-continued

| K | N | $S_0$ | $S_1$ | RIV |
|---|---|---|---|---|
| 1 | 10 | 1 | 5 | 381 |
| 1 | 10 | 1 | 6 | 380 |
| 1 | 10 | 2 | 3 | 374 |
| 1 | 10 | 2 | 4 | 373 |
| 1 | 10 | 2 | 5 | 372 |
| 1 | 10 | 2 | 6 | 371 |
| ... | ... | ... | ... | ... |
| 1 | 10 | 8 | 10 | 334 |
| 1 | 10 | 8 | 11 | 333 |
| 1 | 10 | 9 | 10 | 332 |
| 1 | 10 | 9 | 11 | 331 |
| 1 | 10 | 10 | 11 | 330 |

In this embodiment, each RIV is indicated by Q bits, where:

$$Q = \left\lceil \log_2\left(\sum_{i=1}^{2K_{max}} C_N^i\right)\right\rceil = \left\lceil \log_2\left(\sum_{i=1}^{4} C_{10}^i\right)\right\rceil = \lceil \log_2 385 \rceil = 9.$$

At the receiving device, the terminal determines the resource allocation information according to the RIV in a following manner:

1. Determining the number K of the allocated clusters, K=U;
wherein the RIV belongs to the range $$\left[\sum_{i=U+1}^{K_{max}} C_{N+1}^{2i}, \sum_{i=U}^{K_{max}} C_{N+1}^{2i}\right),$$

$U \in \{K_{max}, K_{max}-1, K_{max}-2, \ldots, 1\}$ and it should be noted that $U = K_{max}$ and $$\sum_{i=U+1}^{K_{max}} C_{N+1}^{2i} = 0.$$

2. Determining the starting resource index and the ending resource index of each cluster in, for example, the following manner.

$$RIV = RIV - \sum_{i=K+1}^{K_{max}} C_{N+1}^{2i},$$

therefore, when the RIV belongs to the range $[C_{N+1-x(0)}^{2K}, C_{N+2-x(0)}^{2K})$, $x(0) \in \{1, 2, 3, \ldots, N\}$, $S_0 = x(0)$. When there are a plurality of $x(0)$ satisfying the condition, $S_0$ takes the smallest one of the plurality of $x(0)$.

$RIV = RIV - C_{N+1-S_0}^{2K}$

When the RIV belongs to the range $[C_{N+1-x(1)}^{2K-1}, C_{N+2-x(1)}^{2K-1})$, $x(1) \in \{S_0+1, S_0+2, \ldots, N\}$, $S_1 = x(1)$. When there are a plurality of $x(1)$ satisfying the condition, $S_1$ takes the smallest one of the plurality of $x(1)$.

$RIV = RIV - C_{N+1-S_1}^{2K-1}$,

When the RIV belongs to the range $[C_{N+1-x(2)}^{2K-2}, C_{N+2-x(2)}^{2K-2})$, $x(2) \in \{S_1+1, S_1+2, \ldots, N\}$, $S_2 = x(2)$. When there are a plurality of $x(2)$ satisfying the condition, $S_2$ takes the smallest one of the plurality of $x(2)$.

It should be noted that, other operations in this embodiment may be deduced by analogy, and therefore no further details are provided herein.

The following describes this embodiment by using examples with reference to exemplary implementations of this embodiment.

In a case where N=10, $K_{max}=2$, the manner in which the terminal determines the resource allocation according to the received RIV value is described as follows.

For example, in the case of RIV=384, the value of K is determined. Since $K_{max}=2$, the received RIV value is divided into two ranges:

when U=2, the corresponding range is $$\left[\sum_{i=U+1}^{K_{max}} C_{N+1}^{2i}, \sum_{i=U}^{K_{max}} C_{N+1}^{2i}\right) = [0, C_{11}^4) = [0, 330);$$

and when U=1, the corresponding range is $$\left[\sum_{i=U+1}^{K_{max}} C_{N+1}^{2i}, \sum_{i=U}^{K_{max}} C_{N+1}^{2i}\right) = [C_{11}^4, C_{11}^2 + C_{11}^4) = [330, 385).$$

Since RIV=384, which belongs to the range of U=1, K=1, that is, one cluster is allocated. The starting resource index and the ending resource index corresponding to the cluster are further determined.

The value of the RIV is updated as $$RIV = RIV - \sum_{i=K+1}^{K_{max}} C_{N+1}^{2i} = 384 - C_{11}^4 = 384 - 330 = 54.$$

When x(0)=1, the corresponding range is $[C_{N+1-x(0)}^{2K}, C_{N+2-x(0)}^{2K}) = [45, 55)$. Since RIV=54 belongs to this range, $S_0 = x(0) = 1$.

The value of the RIV is updated as $RIV = RIV - C_{N+1-S_0}^{2K} = 54 - 45 = 9$.

When x(1)=2, the corresponding range is $[C_{N+1-x(1)}^{2K-1}, C_{N+2-x(1)}^{2K-1}) = [9, 10)$. Since the RIV belongs to this range, $S_1 = x(1) = 2$.

Therefore, when the received RIV=384, it can be determined that one cluster of resource is correspondingly allocated, and the allocated resource is a resource with a resource index of 1. In this example, $S_1 - S_0 = 1$, therefore the corresponding resource is a PRB with a resource index being 1.

As shown in Table 3, RIV=384 corresponds to $S_0=1, S_1=2$, that is, the corresponding resource allocation is resource allocation with a resource index being 1.

For another example, in a case where RIV=328, the value of K is determined.

Since $K_{max}=2$, the received RIV value is divided into two ranges:

when U=2, the corresponding range is $$\left[\sum_{i=U+1}^{K_{max}} C_{N+1}^{2i}, \sum_{i=U}^{K_{max}} C_{N+1}^{2i}\right) = [0, C_{11}^4) = [0, 330);$$

and
when U=1, the corresponding range is $$\left[\sum_{i=U+1}^{K_{max}} C_{N+1}^{2i}, \sum_{i=U}^{K_{max}} C_{N+1}^{2i}\right) = [C_{11}^4, C_{11}^2 + C_{11}^4) = [330, 385).$$

Since RIV=328, which belongs to the range of U=2, K=2, i.e. two clusters are allocated. The starting resource indexes and the ending resource indexes corresponding to the clusters are determined.

The value of the RIV is updated as $$RIV = RIV - \sum_{i=K+1}^{K_{max}} C_{N+1}^{2i} = 328 - 0 = 328.$$

When $x(0)=1$, the range is $[C_{N+1-x(0)}^{2K}, C_{N+2-x(0)}^{2K})= [C_{10}^4, C_{10}^4)=[210, 330)$. Since RIV=328, which belongs to this range, $S_0=x(0)=1$.

The value of the RIV is updated as RIV=RIV-$C_{N+1-S_0}^{2K}$=328-$C_{10}^4$=328-210=118.

When $x(1)=2$, the range is $[C_{N+1-x(1)}^{2K-1}, C_{N+2-x(1)}^{2K-1})= [C_9^3, C_{10}^3)=[84,128)$. Since RIV=118, which belongs to this range, $S_1=x(1)=2$.

The value of the RIV is updated as RIV=RIV-$h$ $C_{N+1-S_1}^{2K-1}$=118-$C_9^3$=118-84=34.

When $x(2)=3$, the range is $[C_{N+1-x(2)}^{2K-2}, C_{N+2-x(2)}^{2K-2})= [C_8^2, C_9^2)=[28, 36)$. Since RIV=34, which belongs to this range, $S_2=x(2)=3$.

The value of the RIV is updated as RIV=RIV-$C_{N+1-S_2}^{2K-2}$=34-$C_8^2$=34-28=6.

When $x(3)=5$, the range is $[C_{N+1-x(2)}^{2K-3}, C_{N+2-x(1)}^{2K-3})= [C_6^1, C_7^1)=[6, 7)$. Since RIV=6, which belongs to this range, $S_3=x(3)=5$.

Therefore, when the received RIV=328, two clusters of resources are correspondingly allocated. The starting resource index and the ending resource index of the resource allocation corresponding to the first cluster is $S_0$, $S_1-1$, that is, the resource allocation of the first cluster is a resource with a resource index of 1. The starting resource index and the ending resource index of the resource allocation corresponding to the second cluster is $S_2$, $S_3-1$, that is, the resource allocation of the second cluster is resources with resource indexes of {3, 4}.

As shown in Table 4, RIV=328 corresponds to $S_0=1$, $S_1=2$, $S_2=3$, $S_3=5$, that is, one cluster with a resource index of 1 and another cluster with resource indexes of {3, 4} are allocated.

It should be noted that, the foregoing resources are logical concepts, and in a specific application, one resource may be one resource block, one PRB, one Resource Block Group (RBG), one subband, one symbol, or a combination of these types of resources according to a practical requirement.

In addition, in this embodiment, the parameters N and $K_{max}$ are predefined parameters, or parameters configured for the terminal by the base station in advance, or a combination of predefined parameters and parameters configured for the terminal by the base station in advance. The parameters N and $K_{max}$ satisfy $4K_{max}+1 \leq N$.

Embodiment 3

Based on embodiment 2, in order to further reduce the overhead of resource allocation, in this embodiment, it is restricted that the number of resources included in each cluster is greater than one preset threshold X (X is a positive integer), that is, the allocated cluster at least contains X+1 resources. In this case, under the premise that $K_{max}$ and N are known to the transmitter and the receiver in advance, the indication method of this embodiment is described as follows.

Manner 1 (Corresponding to the Exemplary Implementation 4 in the Foregoing Embodiment 1)

A Resource Indication Value (RIVx) corresponds to the number K of allocated clusters and the starting resource index and the ending resource index of each cluster. The RIVx may be determined according to the following formula 2-1:

$$RIV_X = \sum_{i=1}^{K-1} C_{N+1-iX}^{2i} + \qquad \text{(Formula 2-1)}$$
$$\sum_{i=0}^{K-1} \left( C_{N+1-S_{2i}-(K-i)X}^{2K-2i} + C_{N+1-S_{2i+1}-(K-1-i)X}^{2K-(2i+1)} \right)$$

In some exemplary implementations, Q bits are used to indicate resource allocation information (the RIVx). The value of Q may be determined according to the following formula 2-2:

$$Q = \left\lceil \log_2 \left( \sum_{i=1}^{K_{max}} C_{N+1-iX}^{2i} \right) \right\rceil \qquad \text{(Formula 2-2)}$$

The following describes this embodiment with reference to exemplary implementations of this embodiment.

In the exemplary implementation, N=10, $K_{max}$=2, X=2. The calculation process for the RIVx is described as follows. In the present exemplary implementation, table 5 illustrates the RIVx values corresponding to the starting resource indexes and the ending resource indexes of different clusters when the number of allocated clusters K=1, and table 6 illustrates the RIVx values corresponding to the starting resource indexes and the ending resource indexes of different clusters when the number of allocated clusters K=2.

When K=1, $S_0$=1, $S_1$=4, the RIVx can be calculated as follows according to formula (2-1):

$$RIV_X = \sum_{i=1}^{K-1} C_{N+1-iX}^{2i} + \sum_{i=0}^{K-1} \left( C_{N+1-S_{2i}-(K-i)X}^{2K-2i} + C_{N+1-S_{2i+1}-(K-1-i)X}^{2K-(2i+1)} \right)$$
$$= 0 + C_{11-1-2}^2 + C_{11-4}^1$$
$$= 28 + 7$$
$$= 35$$

When K=2, $S_0$=1, $S_1$=4, $S_2$=5, $S_3$=9, the RIVx can be calculated as follows according to formula (2-1):

$$RIV_X = \sum_{i=1}^{K-1} C_{N+1-iX}^{2i} + \sum_{i=0}^{K-1} \left( C_{N+1S_{2i}-(K-i)X}^{2K-2i} + C_{N+1-S_{2i+1}-(K-1-i)X}^{2K-(2i+1)} \right)$$

$$= C_{11-2}^2 + C_{11-1-2*2}^4 + C_{11-4-2}^3 + C_{11-5-2}^2 + C_{11-9}^1$$

$$= 36 + 15 + 10 + 6 + 2$$

$$= 69$$

Tables 5 and 6 are as follows:

TABLE 5

| K | N | X | $S_0$ | $S_1$ | RIVx |
|---|---|---|---|---|---|
| 1 | 10 | 2 | 1 | 4 | 35 |
| 1 | 10 | 2 | 1 | 5 | 34 |
| 1 | 10 | 2 | 1 | 6 | 33 |
| 1 | 10 | 2 | 1 | 7 | 32 |
| 1 | 10 | 2 | 1 | 8 | 31 |
| 1 | 10 | 2 | 1 | 9 | 30 |
| 1 | 10 | 2 | 1 | 10 | 29 |
| 1 | 10 | 2 | 1 | 11 | 28 |
| 1 | 10 | 2 | 2 | 5 | 27 |
| 1 | 10 | 2 | 2 | 6 | 26 |
| 1 | 10 | 2 | 2 | 7 | 25 |
| 1 | 10 | 2 | 2 | 8 | 24 |
| 1 | 10 | 2 | 2 | 9 | 23 |
| 1 | 10 | 2 | 2 | 10 | 22 |
| 1 | 10 | 2 | 2 | 11 | 21 |
| 1 | 10 | 2 | 3 | 6 | 20 |
| 1 | 10 | 2 | 3 | 7 | 19 |
| 1 | 10 | 2 | 3 | 8 | 18 |
| 1 | 10 | 2 | 3 | 9 | 17 |
| 1 | 10 | 2 | 3 | 10 | 16 |
| 1 | 10 | 2 | 3 | 11 | 15 |
| 1 | 10 | 2 | 4 | 7 | 14 |
| 1 | 10 | 2 | 4 | 8 | 13 |
| 1 | 10 | 2 | 4 | 9 | 12 |
| 1 | 10 | 2 | 4 | 10 | 11 |
| 1 | 10 | 2 | 4 | 11 | 10 |
| 1 | 10 | 2 | 5 | 8 | 9 |
| 1 | 10 | 2 | 5 | 9 | 8 |
| 1 | 10 | 2 | 5 | 10 | 7 |
| 1 | 10 | 2 | 5 | 11 | 6 |
| 1 | 10 | 2 | 6 | 9 | 5 |
| 1 | 10 | 2 | 6 | 10 | 4 |
| 1 | 10 | 2 | 6 | 11 | 3 |
| 1 | 10 | 2 | 7 | 10 | 2 |
| 1 | 10 | 2 | 7 | 11 | 1 |
| 1 | 10 | 2 | 8 | 11 | 0 |

TABLE 6

| K | N | X | $S_0$ | $S_1$ | $S_2$ | $S_3$ | RIVx |
|---|---|---|---|---|---|---|---|
| 2 | 10 | 2 | 1 | 4 | 5 | 8 | 70 |
| 2 | 10 | 2 | 1 | 4 | 5 | 9 | 69 |
| 2 | 10 | 2 | 1 | 4 | 5 | 10 | 68 |
| 2 | 10 | 2 | 1 | 4 | 5 | 11 | 67 |
| 2 | 10 | 2 | 1 | 4 | 6 | 9 | 66 |
| 2 | 10 | 2 | 1 | 4 | 6 | 10 | 65 |
| 2 | 10 | 2 | 1 | 4 | 6 | 11 | 64 |
| 2 | 10 | 2 | 1 | 4 | 7 | 10 | 63 |
| 2 | 10 | 2 | 1 | 4 | 7 | 11 | 62 |
| 2 | 10 | 2 | 1 | 4 | 8 | 11 | 61 |
| 2 | 10 | 2 | 1 | 5 | 6 | 9 | 60 |
| 2 | 10 | 2 | 1 | 5 | 6 | 10 | 59 |
| 2 | 10 | 2 | 1 | 5 | 6 | 11 | 58 |
| 2 | 10 | 2 | 1 | 5 | 7 | 10 | 57 |
| 2 | 10 | 2 | 1 | 5 | 7 | 11 | 56 |
| 2 | 10 | 2 | 1 | 5 | 8 | 11 | 55 |
| 2 | 10 | 2 | 1 | 6 | 7 | 10 | 54 |
| 2 | 10 | 2 | 1 | 6 | 7 | 11 | 53 |
| 2 | 10 | 2 | 1 | 6 | 8 | 11 | 52 |
| 2 | 10 | 2 | 1 | 7 | 8 | 11 | 51 |

TABLE 6-continued

| K | N | X | $S_0$ | $S_1$ | $S_2$ | $S_3$ | RIVx |
|---|---|---|---|---|---|---|---|
| 2 | 10 | 2 | 2 | 5 | 6 | 9 | 50 |
| 2 | 10 | 2 | 2 | 5 | 6 | 10 | 49 |
| 2 | 10 | 2 | 2 | 5 | 6 | 11 | 48 |
| 2 | 10 | 2 | 2 | 5 | 7 | 10 | 47 |
| 2 | 10 | 2 | 2 | 5 | 7 | 11 | 46 |
| 2 | 10 | 2 | 2 | 5 | 8 | 11 | 45 |
| 2 | 10 | 2 | 2 | 6 | 7 | 10 | 44 |
| 2 | 10 | 2 | 2 | 6 | 7 | 11 | 43 |
| 2 | 10 | 2 | 2 | 6 | 8 | 11 | 42 |
| 2 | 10 | 2 | 2 | 7 | 8 | 11 | 41 |
| 2 | 10 | 2 | 3 | 6 | 7 | 10 | 40 |
| 2 | 10 | 2 | 3 | 6 | 7 | 11 | 39 |
| 2 | 10 | 2 | 3 | 6 | 8 | 11 | 38 |
| 2 | 10 | 2 | 3 | 7 | 8 | 11 | 37 |
| 2 | 10 | 2 | 4 | 7 | 8 | 11 | 36 |

In this embodiment, each RIVx is indicated by Q bits, where:

$$Q = \left\lceil \log_2 \left( \sum_{i=1}^{K_{max}} C_{N+1-iX}^{2i} \right) \right\rceil = \lceil \log_2(C_{11-2}^2 + C_{11-4}^4) \rceil = \lceil \log_2(36+35) \rceil = 7.$$

Compared with the Manner 1 in the embodiment 1 in which 9 bits are required for indicating the RIV, the RIVx in this embodiment only requires 7 bits, which saves the overhead by 2 bits.

The above description of the present embodiment is provided from the perspective of the base station. From the perspective of the receiving device, the terminal determines the resource allocation information according to the RIVx in a following manner:

1. Determining the number K of the allocated clusters, K=U, where RIVx belongs to the range $$\left[ \sum_{i=1}^{U-1} C_{N+1-iX}^{2i}, \sum_{i=1}^{U} C_{N+1-iX}^{2i} \right),$$

$U \in \{1, 2, \ldots, K_{max}\}$, as specified herein $$\sum_{i=1}^{0} C_N^i = 0.$$

2. Determining the starting resource index and the ending resource index of each cluster, and the specific process is as follows:

$$RIV_X = RIV_X - \sum_{i=1}^{K-1} C_{N+1-iX}^{2i}$$

For the 0th cluster:

When the RIVx belongs to the range $[C_{N+1-x(0)-KX}^{2K}, C_{N+2-x(0)-KX}^{2K})$, $x(0) \in \{1, 2, 3, \ldots, N-KX\}$, $S_0=x(0)$. When there are a plurality of x(0) satisfying the condition, $S_0$ takes the smallest one of the plurality of x(0).

$$RIV_X = RIV_X - C_{N+1-S_0-KX}^{2K}$$

When the RIVx belongs to the range $[C_{N+1-x(1)-(K-1)X}^{2K-1}, C_{N+2-x(1)-(K-1)X}^{2K-1})$, $x(1) \in \{S_0+1, S_0+2, \ldots, N-KX\}$, $S_1=x(1)$. When there are a plurality of x(1) satisfying the condition, S, takes the smallest one of the plurality of x(1).

$$RIV_X = RIV_X - C_{N+1-S_1-(K-1)X}^{2K-1}$$

For the 1st cluster:
When the RIVx belongs to the range $[C_{N+1-x(2)-(K-1)X}^{2K-2}, C_{N+2-x(2)-(K-1)X}^{2K-2})$, $x(2) \in \{S_1+1, S_1+2, \ldots, N-KX\}$, $S_2=x(2)$. When there are a plurality of x(2) satisfying the condition, $S_2$ takes the smallest one of the plurality of x(2).

$$RIV_X = RIV_X - C_{N+1-S_2-(K-1)X}^{2K}$$

When the RIVx belongs to the range $[C_{N+1-x(2)-(K-2)X}^{2K-3}, C_{N+2-x(1)-(K-1)X}^{2K-3})$, $x(3) \in \{S_2+1, S_2+2, \ldots, N-KX\}$, $S_3=x(3)$. When there are a plurality of x(3) satisfying the condition, $S_3$ takes the smallest one of the plurality of x(3).

$$RIV_X = RIV_X - C_{N+1-S_3-(K-2)X}^{2K-3}$$

For the ith cluster, when the RIVx belongs to the range $[C_{N+1-x(2i)-(K-i)X}^{2K-2i}, C_{N+2-x(2i)-(K-i)X}^{2K-2i})$, $x(2i) \in \{S_{2i-1}+1, S_{2i-1}+2, \ldots, N-KX\}$, $S_{2i}=x(2i)$. When there are a plurality of x(2i) satisfying the condition, $S_{2i}$ takes the smallest one of the plurality of x(2i).

$$RIV_X = RIV_X - C_{N+1-S_{2i}-(K-1)X}^{2K-2i}$$

When the RIVx belongs to the range $[C_{N+1-x(2i+1)-(K-1-i)X}^{2K-(2i+1)}, C_{N+2-x(2i+1)-(K-1-i)X}^{2K-(2i+1)})$, $x(2i+1) \in \{S_{2i}+1, S_{2i}+2, \ldots, N-KX\}$, $S_{2i+1}=x(2i+1)$. When there are a plurality of x(2i+1) satisfying the condition, $S_{2i+1}$ takes the smallest one of the plurality of x(2i+1).

$$RIV_X = RIV_X - C_{N+1-S_{2i}-(K-i)X}^{2K-2i}$$

The above process continues until the calculation for the last cluster is completed (i.e., when i=K-1).

Still taking the foregoing example as an example, assuming that N=10, $K_{max}$=2, X=2, the process that the receiving device determines the resource allocation according to the received RIVx.

A method for a receiving device (e.g., a terminal) is described as follows. For example, when the RIVx received by the terminal is equal to 35, the following operations are performed.
(1) Determining the Value of K Since $K_{max}$=2, the received RIVx value is divided into two ranges:
when U=1, the corresponding range is $$\left[\sum_{i=1}^{U-1} C_{N+1-iX}^{2i}, \sum_{1}^{U} C_{N+1-iX}^{2i}\right) = [0, C_9^2) = [0, 36);$$

and
when U=2, the corresponding range is $$\left[\sum_{i=1}^{U-1} C_{N+1-iX}^{2i}, \sum_{1}^{U} C_{N+1-iX}^{2i}\right) = [C_9^2, C_9^2 + C_7^4) = [36, 71)$$

Since RIVx=35, which belongs to the range of U=1, K=1, that is, one cluster is allocated.

(2) Determining the Starting Resource Index and the Ending Resource Index Corresponding to the Cluster.
The value of the RIVx is updated as $$RIV_X = RIV_X - \sum_{i=1}^{K-1} C_{N+1-iX}^{2i} = 35 - 0 = 35.$$

When x(0)=1, the range is $[C_{N+1-x(0)-KX}^{2K}, C_{N+2-x(0)-KX}^{2K})=[C_{11-1-2}^2, C_{12-1-2}^2=[28, 36)$. Since RIVx=35, which belongs to this range, $S_0=x(0)=1$.

The value of the RIVx is updated as $RIV_X = RIV_X - C_{N+1-S_0-KX}^{2K} = 35 - C_{11-1-2}^2 = 35 - 28 = 7$.

When x(1)=4, the range is $[C_{N+1-x(1)-(K-1)X}^{2K-1}, C_{N+2-x(1)-(K-1)X}^{2K-1})=[C_{11-4}^1, C_{12-4}^1)=[7, 8)$ Since RIVx=7, which belongs to this range, $S_1=x(1)=4$.

Accordingly, when the received RIVx=35, one cluster of resource is correspondingly allocated, and the allocated resources are resources with the starting resource index and the ending resource index respectively being $S_0$, $S_1$−1, that is, resources with resource indexes of {1, 2, 3}.

It can also be seen from Table 5 that, RIVx=35 corresponds to $S_0$=1, $S_1$=4, that is, resource allocation with resource indexes of {1, 2, 3}.

For another example, when the terminal receives RIVx=69, the process performed at the terminal includes the following operations.
(1) Determining the Value of K
Since $K_{max}$=2, the received RIVx value is divided into two ranges;
when U=1, the corresponding range is $$\left[\sum_{i=1}^{U-1} C_{N+1-iX}^{2i}, \sum_{1}^{U} C_{N+1-iX}^{2i}\right) = [0, C_9^2) = [0, 36);$$

and
when U=2, the corresponding range is $$\left[\sum_{i=1}^{U-1} C_{N+1-iX}^{2i}, \sum_{1}^{U} C_{N+1-iX}^{2i}\right) = [C_9^2, C_9^2 + C_7^4) = [36, 71).$$

Since RIVx=69, which belongs to the range of U=2, K=2, that is, two clusters are allocated.
(2) Determining the Starting Resource Indexes and the Ending Resource Indexes Corresponding to the Two Clusters.
The value of the RIVx is updated as $$RIV_X = RIV_X - \sum_{i=1}^{K-1} C_{N+1-iX}^{2i} = 69 - C_9^2 = 69 - 36 = 33.$$

When x(0)=1, the range is $[C_{N+1-x(0)-KX}^{2K}, C_{N+2-x(0)-KX}^{2K})=[C_{11-14}^4, C_{12-1-4}^4)=[15, 35)$. Since RIVx=33, which belongs to this range, $S_0=x(0)=1$.

The value of the RIVx is updated as $RIV_X = RIV_X - C_{N+1-S_0-KX}^{2K} = 33 - C_{11-1-4}^4 = 33 - 15 = 18$.

When x(1)=4, the range is $[C_{N+1-x(1)-(K-1)X}^{2K-1}, C_{N+2-x(1)-(K-1)X}^{2K-1})=[C_{11-4-2}^3, C_{12-4-2}^3)$ [10, 20). Since RIVx=18, which belongs to this range, $S_1=x(1)=4$.

The value of the RIVx is updated as $RIV_X = RIV_X - C_{N+1-S_1(K-1)X}^{2K-1} = 18 - C_{11-4-2}^{3} = 18 - 10 = 8$.

When x(2)=5, the range is $[C_{N+1-x(1)-(K-1)X}^{2K-2}, C_{N+2-x(1)-(K-1)X}^{2K-2}) = [C_{11-5-2}^{2}, C_{12-5-2}^{2}) = [7, 10)$. Since RIVx=8, which belongs to this range, $S_2 = x(2) = 5$.

The value of the RIVx is updated as $RIV_X = RIV_X - C_{N+1-S_2-(K-1)X}^{2K-2} = 8 - C_{11-5-2}^{2} = 8 - 6 = 2$.

When x(2)=9, the range is $[C_{N+1-x(3)}^{2K-3}, C_{N+2-x(2)}^{2K-3}) = [C_{11-9}^{1}, C_{12-9}^{1}) = [2, 3)$. Since RIVx=2, which belongs to this range, $S_3 = x(3) = 9$.

Accordingly, when the received RIVx=69, two clusters of resources are correspondingly allocated. The starting resource index and the ending resource index corresponding to the resource allocation of the first cluster is $S_0$, $S_1-1$, that is, the allocated resources of the first cluster are resources with resource indexes of {1,2,3}. The starting resource index and the ending resource index corresponding to the resource allocation of the second cluster are $S_2$, $S_3-1$, that is, the allocated resources of the second cluster are resources with resource indexes of {5, 6, 7, 8}.

As shown in Table 6, RIVx=69 corresponds to $S_0=1, S_1=4, S_2=5, S_3=9$, that is, one cluster whose resource index is {1,2,3} and another cluster whose resource index is {5, 6, 7, 8} are allocated.

Manner 2 (Corresponding to the Exemplary Implementation 5 in the Foregoing Embodiment 1)

The resource allocation information is divided into two parts, wherein part 1 is the number K of the allocated clusters, and part 2 is the starting resource indexes and the ending resource indexes of the K clusters. Considering that $K_{max}$ clusters are supported at most, $K \in \{1, 2, \ldots, K_{max}\}$. A preferred $K_{max}$ is an integer power of 2, for example, K.=1, 2, 4, 8 . . . . In this case, $\lceil \log_2(K_{max}) \rceil$ bits are adopted to indicate the value of K, and $(Q - \lceil \log_2(K_{max}) \rceil)$ bits are adopted to indicate a value S corresponding to the starting resource indexes and the ending resource indexes of the K clusters. The value of S is determined in a following manner:

$$RIV_X = \sum_{i=0}^{K-1} \left( C_{N+1-S_{2i},-(K-i)X}^{2K-2i} + C_{N+1-S_{2i+1}-(K-1-i)X}^{2K-(2i+1)} \right) \quad \text{(Formula 2-3)}$$

It should be noted that the preset threshold X is a predefined parameter, or a parameter preconfigured for the terminal by the base station.

The method is especially applicable to a situation where resources needing to be avoided by a target terminal may be used by one or more other terminals, and the number of the resources used by the one or more terminals is greater than X.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/ Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

Embodiment 4

A resource allocation device is provided in the present embodiment. The apparatus is used to implement the above embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 4:
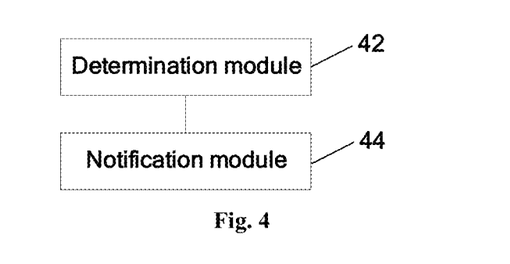
FIG. 4 is a structural block diagram of a resource allocation device according to an embodiment of the present application.

FIG. 4 is a structural block diagram of a resource allocation device according to an embodiment of the present application. As shown in FIG. 4, the device includes: a determination component 42, configured to determine resources needing to be allocated to a second communication node, wherein the resources include K clusters, and each cluster includes one or more continuous resources, a maximum value of K is $K_{max}$, $K_{max}$ is a predefined value or a value agreed in advance between the first communication node and the second communication node, and $K_{max}$ is a positive integer greater than 1; and a notification module 44, coupled to the determination module 42 and configured to notify the second-communication node of the resources, wherein the resources are resources needing to be avoided when the second communication node receives and/or sends a channel or a signal, or resources from which the second communication node, when needing to send data, selects one or more clusters of resources to send the data.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Embodiment 5

The embodiment of the present application provides a storage medium. The storage medium stores a computer program. The computer program is configured to execute the operations in any one of the method embodiments when running.

In some exemplary implementations, the storage medium may be configured to store a computer program for executing the following operations S1 and S2.

In operation S1, a first communication node determines resources needing to be allocated to a second communication node. The resources include K clusters, and each cluster includes one or more continuous resources. A maximum value of K is $K_{max}$, wherein $K_{max}$ is a predefined value or a value agreed in advance between the first communication node and the second communication node, and $K_{max}$ is a positive integer greater than 1.

In operation S2, the first communication node notifies the second communication node of the resources, wherein the resources are resources needing to be avoided when the second communication node receives and/or sends a channel or a signal, or resources from which the second communication node, when needing to send data, selects one or more clusters of resources to send the data.

In some exemplary implementations, the storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiment of the present application also provides an electronic device, including a memory and a processor. The memory stores a computer program, and the processor is configured to run the computer program so as to execute the operations in any one of the method embodiments.

In some exemplary implementations, the electronic device may further include a transmission device and an input/output device. The transmission device is connected to the processor, and the input/output device is connected to the processor.

In some exemplary implementations, the processor may be configured to execute the following operations S1 and S2 by running the computer program.

In operation S1, a first communication node determines resources needing to be allocated to a second communication node. The resources include K clusters, and each cluster includes one or more continuous resources. A maximum value of K is $K_{max}$, wherein $K_{max}$ is a predefined value or a value agreed in advance between the first communication node and the second communication node, and $K_{max}$ is a positive integer greater than 1.

In operation S2, the first communication node notifies the second communication node of the resources, wherein the resources are resources needing to be avoided when the second communication node receives and/or sends a channel or a signal, or resources from which the second communication node, when needing to send data, selects one or more clusters of resources to send the data.

For specific examples in this embodiment, reference may be made to the examples and exemplary implementations described in the foregoing embodiments, and details are not repeatedly described herein in this embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

INDUSTRIAL APPLICABILITY

Through the resource allocation process in the embodiments of the present application, when the second communication node sends a channel or a signal, if the resources occupied by the channel or the signal include the resources needing to be avoided notified by the first communication node, the second communication node needs to stop sending the channel or the signal using the avoided resources. Alternatively, in a case where the second communication node needs to send data, the second communication node selects one or more clusters of resources from the resources to send data. The embodiments therefore solve the problem of high overhead and low reliability caused by adopting a bitmap notification manner in the related art, and reduce the overhead of the resources.

What is claimed is:

1. A resource allocation method, comprising:
   determining, by a first communication node, resources needing to be allocated to a second communication node, wherein the resources comprise K clusters, each cluster comprises one or more continuous resources, a maximum value of K is $K_{max}$, $K_{max}$ is a predefined value or a value agreed in advance between the first communication node and the second communication node, and $K_{max}$ is a positive integer greater than 1; and
   notifying, by the first communication node, the second communication node of the resources, wherein the resources are resources needing to be avoided when the second communication node receives and/or sends a channel or a signal, or resources from which the second communication node, when needing to send data, selects one or more clusters of resources to send the data, wherein determining, by the first communication node, the resources needing to be allocated to a second communication node comprises:
   allocating, by the first communication node according to the number N of resources, the K clusters of resources to the second communication node from the N resources, wherein N is a positive integer, and in a case where the allocated resources are the K clusters, $S_{2i}$ and $(S_{2i+1}-1)$ are respectively a starting resource index and an ending resource index of the ith cluster, and $S_i$ (i=0, 1 . . . 2K−1) is a positive integer increasing monotonically;
   determining, by the first communication node, a Resource Indication Value (RIV) according to N, K and the starting resource indexes and the ending resource indexes of the clusters; and
   indicating, by the first communication node, the RIV to the second communication node through at least one first designated bit, wherein the RIV is determined in a following manner:
   when K=1, the RIV is determined according to N, and the starting resource indexes and the ending resource indexes of the clusters;
   when K>1, the RIV is determined according to N, the starting resource indexes and the ending resource indexes of the clusters, and a sum of allocated numbers of resources when cluster numbers are respectively 1, 2 . . . K−1.

2. The method according to claim 1, wherein the RIV is determined according to a following formula:

$$RIV = \sum_{i=1}^{K-1} C_{N+1}^{2i} + \sum_{i=0}^{2K-1} C_{N+1-S_i}^{2K-i}, \text{ where } \sum_{i=1}^{0} C_{N+1}^{i} = 0;$$

or,

-continued $$RIV = \sum_{i=0}^{K-1} \left( C_{N+1}^{2i} + C_{N+1-S_i}^{2K-i} + C_{N+1-S_{K+i}}^{K-i} \right) - 1;$$

wherein $K \in \{1, 2, \ldots, K_{max}\}$.

3. The method according to claim 1, wherein the number of bits corresponding to the at least one first designated bit is not less than Q, where Q satisfies a following formula:

$$Q = \left\lceil \log_2 \left( \sum_{i=1}^{2K_{max}} C_N^i \right) \right\rceil.$$

4. The method according to claim 1, wherein determining, by the first communication node, the resources needing to be allocated to a second communication node comprises:
   determining, by the first communication node, that a total number of resources is N, and allocating, by the first communication node, the K clusters of resources to the second communication node from the N resources, wherein N is a positive integer, and in a case where the allocated resources are the K clusters, $S_{2i}$ and $(S_{2i+1}-1)$ are respectively a starting resource index and an ending resource index of the ith cluster, and $S_i (i=0, 1 \ldots 2K-1)$ is a positive integer increasing monotonically;
   in a case where the allocated resources are the K clusters, dividing, by the first communication node, resource allocation indication information for indicating resource allocation into first indication information and second indication information, wherein the first indication information indicates the number K of the allocated clusters, the second indication information indicates starting resource indexes and ending resource indexes of the K clusters, and a value of $K_{max}$ is an integer power of 2;
   determining, by the first communication node, a Resource Indication Value (RIV) according to N, the first indication information and the second indication information; and
   indicating, by the first communication node, the number K of the allocated clusters and the RIV to the second communication node through second designated bits;
   wherein the number of bits corresponding to the second designated bits is not less than Q, wherein $\lceil \log_2 (K_{max}) \rceil$ bits of the second designated bits indicate the number K of the allocated clusters, and $Q - \lceil \log_2(K_{max}) \rceil$ bits of the second designated bits indicate the RIV;
   where a value of Q satisfies a following formula:

$$Q = \left\lceil \log_2 \left( \sum_{i=1}^{2K_{max}} C_N^i \right) \right\rceil.$$

5. The method according to claim 4, wherein the RIV is determined according to a following formula:

$$RIV = \sum_{i=0}^{2K-1} C_{N+1-S_i}^{2K-i},$$

wherein $K \in \{1, 2, \ldots, K_{max}\}$.

6. The method according to claim 1, wherein determining, by the first communication node, the resources needing to be allocated to a second communication node comprises:
   allocating, by the first communication node according to the number N of resources, the K clusters of resources to the second communication node from the N resources, wherein in a case where the allocated resources are the K clusters, $S_{2i}$ and $(S_{2i+1}-1)$ are respectively a starting resource index and an ending resource index of the ith cluster, K and N are positive integers, and $S_i (i=0, 1 \ldots 2K-1)$ is a positive integer increasing monotonically;
   determining, by the first communication node, a Resource Indication Value (RIV) for indicating a resource allocation value according to N, K and the starting resource indexes and the ending resource indexes of the clusters; and
   indicating, by the first communication node, the RIV to the second communication node through at least one third designated bit.

7. The method according to claim 6, wherein the RIV is determined in a following manner:
   when $K = K_{max}$, the RIV is determined according to N, and the starting resource indexes and the ending resource indexes of the clusters;
   when $1 \leq K < K_{max}$, the RIV is determined according to N, the starting resource indexes and the ending resource indexes of the clusters, and a sum of allocated numbers of resources when cluster numbers are respectively $K+1 \ldots K_{max}$.

8. The method according to claim 7, wherein the RIV is determined according to a following formula:

$$RIV = \sum_{i=K+1}^{K_{max}} C_{N+1}^{2i} + \sum_{i=0}^{2K-1} C_{N+1-S_i}^{2K-i},$$

wherein $$\sum_{i=K_{max}+1}^{K_{max}} C_{N+1}^{2i} = 0,$$

and $K \in \{1, 2, \ldots, K_{max}\}$.

9. The method according to claim 1, wherein determining, by the first communication node, the resources needing to be allocated to a second communication node comprises:
   allocating, by the first communication node according to the number N of resources, the K clusters of resources to the second communication node from the N resources, wherein the number of resources of each cluster is greater than a preset threshold X, K and N are positive integers; in a case where the number of the resources of each cluster is greater than the preset threshold X and the allocated resources are the K clusters, $S_{2i}$ and $(S_{2i+1}-1)$ are respectively a starting resource index and an ending resource index of the ith cluster, and $S_i (i=0, 1 \ldots 2K-1)$ is a positive integer increasing monotonically;
   determining, by the first communication node, a Resource Indication Value (RIVx) for indicating a resource allocation value according to N, K, X and the starting resource indexes and the ending resource indexes of the clusters; and indicating, by the first communication node, the RIVx through at least one fourth designated bit.

10. The method according to claim 9, wherein the RIVx is determined in a following manner:
when K=1, the RIVx is determined according to N, X and the starting resource indexes and the ending resource indexes of the clusters;
when K>1, the RIVx is determined according to N, X, the starting resource indexes and the ending resource indexes of the clusters, and a sum of allocated numbers of resources when cluster numbers are respectively 1, 2 . . . K−1.

11. The method according to claim 10, wherein the RIVX is determined according to a following formula:

$$RIV_X = \sum_{i=1}^{K-1} C_{N+1-iX}^{2i} + \sum_{i=0}^{K-1} \left( C_{N+1-S_{2i}-(K-i)X}^{2K-2i} + C_{N+1-S_{2i+1}-(K-1-i)X}^{2K-(2i+1)} \right)$$

wherein K∈{1, 2, . . . , $K_{max}$}.

12. The method according to claim 1, wherein
determining, by the first communication node, the resources needing to be allocated to a second communication node comprises:
determining, by the first communication node, that a total number of resources is N, and allocating, by the first communication node, the K clusters of resources to the second communication node from the N resources, wherein N is a positive integer, and in a case where the allocated resources are the K clusters, $S_{2i}$ and ($S_{2i+1}$−1) are respectively a starting resource index and an ending resource index of the ith cluster, each cluster comprises one or more continuous resources, the number of the resources of each cluster is greater than a preset threshold X, $S_i$(i=0, 1 . . . 2K−1) is a positive integer increasing monotonically, and X is a positive integer;
in a case where the allocated resources are the K clusters, dividing, by the first communication node, resource allocation indication information for indicating resource allocation into first indication information and second indication information, wherein the first indication information indicates the number K of the allocated clusters, the second indication information indicates starting resource indexes and ending resource indexes of the K clusters, and a value of $K_{max}$ is an integer power of 2;
determining, by the first communication node, a Resource Indication Value (RIVx) according to N, the first indication information and the second indication information;
indicating, by the first communication node, the number K of the allocated clusters and the RIVx to the second communication node through fifth designated bits;
wherein the number of bits corresponding to the fifth designated bits is not less than Q, wherein $\lceil \log_2 K_{max} \rceil$ bits of the fifth designated bits indicate the number K of the allocated clusters, Q−$\lceil \log_2(K_{max}) \rceil$ bits of the fifth designated bits indicate the RIVx, and a value of satisfies a following formula:

$$Q = \left\lceil \log_2 \left( \sum_{i=1}^{K_{max}} C_{N+1-iX}^{2i} \right) \right\rceil.$$

13. The method according to claim 12, wherein the RIVx is determined according to a following formula:

$$RIV_X = \sum_{i=0}^{K-1} \left( C_{N+1-S_{2i}-(K-1)X}^{2K-2i} + C_{N+1-S_{2i+1}-(K-1-i)X}^{2K-(2i+1)} \right)$$

wherein K∈{1, 2, . . . , $K_{max}$}.

14. The method according to claim 1, wherein determining, by the first communication node, the resources needing to be allocated to a second communication node comprises:
allocate, by the first communication node according to the number N of resources, the K clusters of resources to the second communication node from the N resources, wherein the number of resources of each cluster is greater than a preset threshold X, K and N are positive integers; in a case where the number of the resources of each cluster is greater than the preset threshold X and the allocated resources are the K clusters, $S_{2i}$ and ($S_{2i+1}$−1) are respectively a starting resource index and an ending resource index of the ith cluster, $S_i$(i=0, 1 . . . 2K−1) is a positive integer increasing monotonically, and X is a positive integer;
determining, by the first communication node, a Resource Indication Value (RIVx) for indicating a resource allocation value according to N, K, X and the starting resource indexes and the ending resource indexes of the clusters; and
indicating, by the first communication node, the RIVx to the second communication node through at least one sixth designated bit.

15. The method according to claim 14, wherein the RIVX is determined in a following manner:
when K=$K_{max}$, the RIVx is determined according to N, X and the starting resource indexes and the ending resource indexes of the clusters;
when 1<=K<$K_{max}$, the RIVx is determined according to N, X, the starting resource indexes and the ending resource indexes of the clusters, and a sum of allocated numbers of resources when cluster numbers are respectively K+1 . . . $K_{max}$.

16. The method according to claim 15, wherein the RIVx is determined according to a following formula:

$$RIV_x = \sum_{i=K+1}^{K_{max}} C_{N+1-iX}^{2i} + \sum_{i=0}^{K-1} \left( C_{N+1-S_{2i}-(K-i)X}^{2K-2i} + C_{N+1-S_{2i+1}-(K-1-i)X}^{2K-(2i+1)} \right),$$

wherein K∈{1, 2, . . . , $K_{max}$}.

17. A resource allocation device, applied to a first communication node, the device comprising a memory storing instructions and a processor in communication with the memory, wherein the processor is configured to execute the instructions to:
determine resources needing to be allocated to a second communication node, wherein the resources comprise K clusters, each cluster comprises one or more continuous resources, a maximum value of K is $K_{max}$, $K_{max}$ is a predefined value or a value agreed in advance between the first communication node and the second communication node, and $K_{max}$ is a positive integer greater than 1; and
notify the second communication node of the resources, wherein the resources are resources needing to be avoided when the second communication node receives and/or sends a channel or a signal, or resources from which the second communication node, when needing to send data, selects one or more clusters of resources to send the data, wherein the processor is further configured to execute the instructions to allocate the K clusters of resources to the second communication node from the N resources according to the number N of resources, wherein N is a positive integer, and in a case where the allocated resources are the K clusters, $S_{2i}$ and $(S_{2i+1}-1)$ are respectively a starting resource index and an ending resource index of the ith cluster, and $S_i(i=0, 1 \ldots 2K-1)$ is a positive integer increasing monotonically;

determine a Resource Indication Value (RIV) according to N, K and the starting resource indexes and the ending resource indexes of the clusters; and indicate the RIV to the second communication node through at least one first designated bit, wherein the RIV is determined in a following manner:

when K=1, the RIV is determined according to N, and the starting resource indexes and the ending resource indexes of the clusters;

when K>1, the RIV is determined according to N, the starting resource indexes and the ending resource indexes of the clusters, and a sum of allocated numbers of resources when cluster numbers are respectively 1, 2 . . . K−1.

18. A non-transitory computer readable storage medium, wherein the computer readable storage medium stores a computer program which, when being run by a processor of a controller, is configured to cause the processor to:

determine resources needing to be allocated to a second communication node, wherein the resources comprise K clusters, each cluster comprises one or more continuous resources, a maximum value of K is $K_{max}$, $K_{max}$ is a predefined value or a value agreed in advance between the first communication node and the second communication node, and $K_{max}$ is a positive integer greater than 1; and notify the second communication node of the resources, wherein the resources are resources needing to be avoided when the second communication node receives and/or sends a channel or a signal, or resources from which the second communication node, when needing to send data, selects one or more clusters of resources to send the data, wherein the processor of the controller is further configured to cause the processor to allocate the K clusters of resources to the second communication node from the N resources according to the number N of resources, wherein N is a positive integer, and in a case where the allocated resources are the K clusters, $S_{2i}$ and $(S_{2i+1}-1)$ are respectively a starting resource index and an ending resource index of the ith cluster, and $S_i(i=0, 1 \ldots 2K-1)$ is a positive integer increasing monotonically;

determine a Resource Indication Value (RIV) according to N, K and the starting resource indexes and the ending resource indexes of the clusters; and indicate the RIV to the second communication node through at least one first designated bit, wherein the RIV is determined in a following manner:

when K=1, the RIV is determined according to N, and the starting resource indexes and the ending resource indexes of the clusters;

when K>1, the RIV is determined according to N, the starting resource indexes and the ending resource indexes of the clusters, and a sum of allocated numbers of resources when cluster numbers are respectively 1, 2 . . . K−1.

* * * * *